(12) United States Patent
Cai et al.

(10) Patent No.: US 11,694,003 B2
(45) Date of Patent: Jul. 4, 2023

(54) RADIATION EFFECT SHIELDING CALCULATION METHOD AND DEVICE BASED ON THREE-DIMENSIONAL SPACECRAFT MODEL

(71) Applicant: National Space Science Center, CAS, Beijing (CN)

(72) Inventors: Minghui Cai, Beijing (CN); Liangliang Xu, Beijing (CN); Tao Yang, Beijing (CN); Jianwei Han, Beijing (CN)

(73) Assignee: NATIONAL SPACE SCIENCE CENTER, CAS, Beijing (CN)

( * ) Notice: Subject to any disclaimer, the term of this patent is extended or adjusted under 35 U.S.C. 154(b) by 0 days.

(21) Appl. No.: 17/956,872

(22) Filed: Sep. 30, 2022

(65) Prior Publication Data

US 2023/0096653 A1    Mar. 30, 2023

Related U.S. Application Data

(63) Continuation of application No. PCT/CN2022/108560, filed on Jul. 28, 2022.

(30) Foreign Application Priority Data

Sep. 30, 2021  (CN) .......................... 202111158600.7

(51) Int. Cl.
  *G06F 30/20*  (2020.01)
  *G06F 30/15*  (2020.01)
  *G06F 111/10* (2020.01)

(52) U.S. Cl.
  CPC .............. *G06F 30/20* (2020.01); *G06F 30/15* (2020.01); *G06F 2111/10* (2020.01)

(58) Field of Classification Search
  CPC .......... G06F 30/20; G06F 30/00; G06F 30/15; G06F 2111/10; G06F 2119/02

(Continued)

(56) References Cited

U.S. PATENT DOCUMENTS 8,117,013 B2 *  2/2012  Wilson ...................... G21F 1/00
                                                              703/2

FOREIGN PATENT DOCUMENTS

| CN | 111581719 A | * | 8/2020 |
| CN | 111581719 A |   | 8/2020 |
| CN | 113886961 A | * | 1/2022 |

OTHER PUBLICATIONS

CNIPA, Notification of a First Office Action for CN202111158600.7, dated May 30, 2022.

(Continued)

*Primary Examiner* — Cedric Johnson
(74) *Attorney, Agent, or Firm* — Zhigang Ma

(57) ABSTRACT

A radiation effect shielding calculation method based on a three-dimensional spacecraft model is provided. The method includes obtaining the three-dimensional spacecraft model; dividing a $4\pi$ space irradiation environment into meshes to obtain space irradiation vectors corresponding to the meshes respectively; setting one or more analysis points at each target model component; inputting the space irradiation vectors to the three-dimensional spacecraft model to obtain a three-dimensional distribution of actual shielding at each analysis point; obtaining a three-dimensional distribution of an equivalent aluminum shielding thicknesses according to equivalent thickness conversion for different materials; calculating residual irradiation effect values of the three-dimensional distribution of the equivalent aluminum shielding thicknesses of each analysis point to obtain corresponding detailed irradiation data; and performing information post processing and integrating in all directions to obtain a corresponding total radiation effect value.

5 Claims, 11 Drawing Sheets

(58) Field of Classification Search
USPC .............................................................. 703/2
See application file for complete search history.

(56) References Cited

OTHER PUBLICATIONS

National Space Science Center, CAS (Applicant), Reply to Notification of a First Office Action for CN202111158600.7, w/ (allowed)replacement claims, dated Jun. 15, 2022.
CNIPA, Notification to grant patent right for invention in CN202111158600.7, dated Jul. 15, 2022.

* cited by examiner

RADIATION EFFECT SHIELDING CALCULATION METHOD AND DEVICE BASED ON THREE-DIMENSIONAL SPACECRAFT MODEL

TECHNICAL FIELD

The disclosure relates to a field of aerospace technology, in particular to a radiation effect shielding calculation method and device based on a three-dimensional spacecraft model.

BACKGROUND

As aerospace technology receives more and more attention, there are also many spacecraft entering into space. There is a meteorological environment on the earth, and there is also a space environment in space. According to incomplete statistics, spacecraft failures are caused by the space environment in 40 percent, some even reach 80 percent, and failures caused by radiation environment dominate. The radiation environment mainly comes from three sources, including galactic cosmic rays, solar cosmic rays and earth radiation belt (also referred to Van Allen zone). High-energy particles generated by the radiation environment pass through the spacecraft skin to a position of a single-unit component, which may produce radiation dose, single event upset, displacement damage, deep dielectric charging and discharging and other effects to cause a breakage of the spacecraft. Therefore, spacecraft protection is critical. In order to reduce incidence of spacecraft failures, spacecraft irradiation resistance should be analyzed and calculated while manufacturing to improve properties of the spacecraft according to the calculation results.

In order to evaluate risks of space radiation effects on space components and materials as accurately as possible, it is necessary to use a spacecraft model for three-dimensional (3D) simulation calculation. In response to the above demand, mature technologies such as FASTRAD (also referred to a 3D CAD tool for radiation shielding analysis) and Sector Shielding Analysis Tool (SSAT) are available, which are not yet widely attainable.

Technical problems in the existing methods for realizing spacecraft 3D shielding simulation are as follows.

1. General format files (such as .step and .iges, which are used in file suffixes).

Since a three-dimensional spacecraft model contains many components, information such as unit system, position, and material can be changed or lost while reading, which results in information of the three-dimensional spacecraft model to be inaccurately read.

2. According to demands of calculation efficiency, the three-dimensional spacecraft model cannot be simplified, model material and other information settings cannot be modified and appropriate material properties of different components cannot be assigned.

3. It is impossible to quickly perform mesh division or mesh homogenization. The existing mesh division causes low accuracy in analysis results. In addition, the number and the size of the meshes vary, and there are narrow meshes.

4. Based on an equivalent shielding thickness of analysis points at all directions, it is impossible to select a proper method to work out an actual three-dimensional shielding thickness. Therefore, it is not possible to implement a three-dimensional shielding thickness analysis method for different radiation sources.

5. It is impossible to complete a dose calculation of the analysis point in each direction or a total dose calculation of the analysis point.

6. It is impossible to intelligently display two-dimensional and three-dimensional cloud images of the three-dimensional dose results or generate statement. It is also impossible to provide various cloud images and ray diagrams to display or quickly locate a weaker shielding area and the corresponding components according to the cloud images.

SUMMARY

To make up for deficiencies of the related art, the disclosure provides a radiation effect shielding calculation method based on a three-dimensional spacecraft model, which includes:

step 1, obtaining the three-dimensional spacecraft model;

step 2, dividing a $4\pi$ space irradiation environment, where the three-dimensional spacecraft model is located, into meshes to obtain space irradiation vectors corresponding to the meshes respectively and taking the space irradiation vectors as whole-space irradiation vectors;

setting one or more analysis points at each target model component in the three-dimensional spacecraft model;

step 3, inputting the whole-space irradiation vectors corresponding to each analysis point to the three-dimensional spacecraft model to perform shielding calculation by a shielding thickness calculation method; according to a type of radiation particles, selecting a slant method or a norm method or a weight method to obtain a three-dimensional distribution of actual shielding thicknesses at each analysis point; performing an equivalent thickness conversion for different materials to obtain a three-dimensional distribution of equivalent aluminum shielding thicknesses including different directions and solid angles of each analysis point;

step 4, according to an acquired radiation effect curve, calculating residual irradiation effect values of the three-dimensional distribution of the equivalent aluminum shielding thicknesses of each analysis point to obtain detailed irradiation data of a three-dimensional distribution of irradiation effect values of each analysis point;

step 5, performing information post processing on the detailed irradiation data of the three-dimensional distribution of the irradiation effect values of each analysis point to generate and display a two-dimensional cloud image, a three-dimensional cloud image, a three-dimensional ray diagram and a detailed three-dimensional distribution statement of radiation effect; integrating the detailed radiation data of the three-dimensional distribution of the irradiation effect values of each analysis point in all directions to obtain a total radiation effect value of each analysis point to evaluate an irradiation effect of each analysis point.

As one of improvements of the above technical solution, a specific process of step 1 includes:

obtaining a three-dimensional spacecraft model file in a step format file (also referred to as .STEP file) or an iges format file (also referred to as .IGS file);

extracting information of the three-dimensional spacecraft model file to obtain model information, which includes units, densities, volumes, masses and names of model components;

intelligently checking density accuracy and unit consistency of the model components of the model information; performing interference check to determine whether model entities overlap and intelligently modifying the model information to make the densities of the model components be accurate, the units of the model components be consistent, and the model entities do not overlap;

according to needs of a user, respectively presetting threshold values in density, volume, mass and name; determining whether the densities, the units, the volumes, the masses and the names are coved in presetting threshold value ranges respectively;

if any one of the densities, the units, the volumes, the masses and the names in the model information exceeds the presetting threshold value ranges respectively, adjusting the one of the densities, the units, the volumes, the masses and the names until that the densities, the units, the volumes, the masses and the names in the model information are within the presetting threshold value ranges respectively;

if the densities, the units, the volumes, the masses and the names in the model information are within the presetting threshold value ranges respectively, completing filtering and simplifying the model components of the three-dimensional spacecraft model;

setting specific material properties of the model components of the three-dimensional spacecraft model by material leading-in or interface setting to determine the material properties of the model components;

thereby obtaining the three-dimensional spacecraft model.

As one of improvements of the above technical solution, a specific process of step 2 includes:

according to needs of calculation accuracy and efficiency, selecting an equal-angle mesh division with equal angles in longitude and latitude directions, or an equal-area mesh division with equal angles in a longitude direction and equal heights in a latitude direction, or an intelligent mesh division with equal angles in a longitude direction and equal heights in a latitude direction as well as mesh optimization in two poles; setting numbers of longitudinal divisions and latitudinal divisions in the mesh division to divide the $4\pi$ space irradiation environment, where the three-dimensional spacecraft model is located, into the meshes;

setting one or more analysis points at each of target model components in the three-dimensional spacecraft model by importing position coordinates of the one or more analysis points in batches or using a mouse to click positions at the target model components;

using a ray tracing method, which takes each analysis point as a starting point, assigns the meshes irradiation vectors to obtain the space irradiation vectors corresponding to the meshes respectively; taking the space irradiation vectors as the whole-space irradiation vectors corresponding to each analysis point. It is noted that the irradiation vectors pass through geometrical centers of the meshes corresponding thereto and cover the model entities, which are centered on each analysis point and outward directions.

As one of improvements of the above technical solution, a specific process of step 3 includes:

inputting the whole-space irradiation vectors corresponding to each analysis point to the three-dimensional spacecraft model to performing the shielding calculation by the shielding thickness calculation method, obtaining position coordinates $(x_i, y_i, z_i)$ of an intersection of an ith space irradiation vector and the target model component in the three-dimensional spacecraft model;

calculating a distribution $d=\{d_1, d_2, d_3, \ldots, d_n\}$ of actual intersection thicknesses of actual rays in directions of the space irradiation vectors and the target model components in the three-dimensional spacecraft model, which is calculated by the following formula:

$$d_i = \sum_{j=1}^{k} \sqrt{(x_{j1}^2 - x_{j2}^2)}$$

$d_i$ representing the actual intersection thickness of the actual ray in the direction of the ith space irradiation vector and the target model components in the three-dimensional spacecraft model; k representing a quantity of the target model components, which intersect with the ith space irradiation vector; $x_{j1}$ representing the position coordinates $(x_{i1}, y_{i1}, z_{i1})$ of the intersection of the actual incident ray on the jth target model component; $x_{j2}$ representing the position coordinates $(x_{j2}, y_{j2}, z_{j2})$ of the intersection of the actual emergent ray on an jth target model component;

selecting the slant method or the norm method or the weight method according to the type of radiation particles to work out the distribution $d=\{d_1, d_2, d_3, \ldots, d_n\}$ of actual intersection thickness to obtain the three-dimensional distribution of actual shielding thicknesses at each analysis point;

the slant method being to obtain a three-dimensional distribution $d_z=\{d_1, d_2, d_3, \ldots, d_n\}$ of actual shielding thicknesses at each analysis point by the actual rays propagating along a straight line in the target model components;

the norm method being to obtain a three-dimensional distribution $d_f=\{d_1 \times \cos \alpha_1, d_2 \times \cos \alpha_2, d_3 \times \cos \alpha_3, \ldots, d_n \times \cos \alpha_i\}$ of actual shielding thicknesses at each analysis point by the actual rays propagating along a normal direction of an incident point into a surface when the actual rays shoot into the target model components; $\alpha_i$ representing an incident angle, and $i=1, \ldots, n$;

the weight method being to obtain a three-dimensional distribution $$d_q = \left\{ d_1 \times \frac{1}{2}(\cos\alpha_{11} + \cos\alpha_{12}), d_2 \times \frac{1}{2}(\cos\alpha_{21} + \cos\alpha_{22}), \right.$$
$$\left. d_3 \times \frac{1}{2}(\cos\alpha_{31} + \cos\alpha_{32}), \ldots, d_n \times \frac{1}{2}(\cos\alpha_{i1} + \cos\alpha_{i2}) \right\}$$

of actual shielding thicknesses at each analysis point; $\alpha_{i1}$ representing an incident angle and $\alpha_{i2}$ representing an emergent angle, and $i=1, \ldots, n$;

according to material properties of the model components, converting the actual shielding thicknesses at each analysis point to the equivalent aluminum shielding thicknesses to as the equivalent aluminum shielding thicknesses of the space irradiation vectors respectively, and combining the equivalent aluminum shielding thicknesses of the space irradiation vectors corresponding to each analysis point to obtain the three-dimensional distribution of the equivalent aluminum shielding thicknesses including the different directions and the solid angles of each analysis point.

As one of improvements of the above technical solution, a specific process of step 4 includes:

reading the acquired radiation effect curve and extracting radiation effect depths;

comparing the three-dimensional distribution of the equivalent aluminum shielding thicknesses of each analysis point with the radiation effect depths, performing interpolation calculation on radiation effect values corresponding to the radiation effect depths; taking weight according to a proportion of a mesh area corresponding to the space irradiation vectors in a total mesh area to obtain radiation effect values of the space radiation vector and using the radiation effect values as the detailed irradiation data of the three-dimensional distribution of the irradiation effect values of the analysis point;

repeating the above process to obtain the detailed irradiation data of the three-dimensional distribution of the irradiation effect values of each analysis point.

As one of improvements of the above technical solution, a specific process of step 5 include:

displaying the detailed irradiation data of the three-dimensional distribution of the irradiation effect values of each analysis point in color temperature images to obtain the two-dimensional cloud image and the three-dimensional cloud image;

displaying the detailed irradiation data of the three-dimensional distribution of the irradiation effect values of each analysis point in color-temperature colored rays to create the three-dimensional ray diagram;

highlighting and cruise displaying the three-dimensional ray diagram according to a designed longitude and latitude range to display the equivalent aluminum shielding thickness and radiation effect values in the designed longitude and latitude range correspondingly;

generating the detailed three-dimensional distribution statement of radiation effect based on positions of the meshes, the equivalent aluminum shielding thickness and the radiation effect values;

integrating the irradiation effect values of each analysis point in all directions to obtain the total irradiation effect value of each analysis point to evaluate the irradiation effect of each analysis point.

The disclosure provides a radiation effect shielding calculation apparatus based on a three-dimensional spacecraft model, which includes:

a model acquisition module, which is used to obtain the three-dimensional spacecraft model;

a space division module, which is used to divide a 4π space irradiation environment, where the three-dimensional spacecraft model is located, into meshes to obtain space irradiation vectors corresponding to the meshes respectively; take the space irradiation vectors as whole-space irradiation vectors; and set one or more analysis points at each of target model components in the three-dimensional spacecraft model;

a shielding thickness acquisition module, which is used to input the whole-space irradiation vectors to the three-dimensional spacecraft model to perform shielding calculation by a shielding thickness calculation method; select a slant method or a norm method or a weight method according to a type of radiation particles to obtain a three-dimensional distribution of actual shielding thicknesses at each analysis point; and performing an equivalent thickness conversion for different materials to obtain a three-dimensional distribution of equivalent aluminum shielding thicknesses including different directions and solid angles of each analysis point;

an irradiation effect calculation module, which is used to calculate residual irradiation effect values of the three-dimensional distribution of equivalent aluminum shielding thicknesses of each analysis point according to an acquired radiation effect curve to obtain detailed irradiation data of a three-dimensional distribution of irradiation effect values of each analysis point;

an evaluation module, which is used to perform information post processing on the detailed irradiation data of the three-dimensional distribution of the irradiation effect values of each analysis point to generate and display a two-dimensional cloud image, a three-dimensional cloud image, a three-dimensional ray diagram and a detailed three-dimensional distribution statement of radiation effect; and integrate the detailed radiation data of the three-dimensional distribution of the irradiation effect values of each analysis point in all directions to obtain a total irradiation effect value of each analysis point, so as to evaluate an irradiation effect of each analysis point.

The disclosure provides a radiation effect shielding calculation device based on a three-dimensional spacecraft model, which includes a processor and a storage connected with the processor.

The storage is used to store with computer programs.

The processor is used to implement the radiation effect shielding calculation method based on the three-dimensional spacecraft model, when the computer programs are executed by the processor.

Compared with the related art, advantages of the disclosure are as follows.

1. Common 3D spacecraft model format files such as .step format file or .iges format file can be read. The data of the files can be analyzed and modified based on presetting formats to quickly obtain a model with consistent units, accurate densities, and logical model entities, which greatly improves speed and accuracy of model processing.

2. Selecting different mesh division and different simplifying and filtering method can greatly improve calculation efficiency. It is possible to obtain exact position of each analysis point, which greatly improves accuracy of various cloud images and statements.

3. The disclosure visually and accurately displays a three-dimensional distribution of radiation effect shielding value at each analysis point based on the various cloud images and statements. At the same time, an ability to focus on key shielding directions is provided by using cruise display.

4. The disclosure realizes importing and analyzing the three-dimensional model files of common formats of the spacecraft. The disclosure integrates the import and calculation functions of one-dimensional radiation effect depth curves, filters and simplifies model entities according to different conditions, and realizes a variety of algorithms in mesh division and shielding thickness calculation. Furthermore, the three-dimensional cloud diagrams highlight the specific directions.

BRIEF DESCRIPTION OF A DRAWING

DETAILED DESCRIPTION OF THE EMBODIMENTS

The disclosure is further described combined with the attached drawing and embodiments.

The disclosure provides a radiation effect shielding calculation method based on a three-dimensional spacecraft model. The method realizes three-dimensional model reading, model checking and modification, model simplification and material setting, radiation effect depth curve import, mesh division, three-dimensional shielding thickness analysis, three-dimensional dose analysis and three-dimensional dose display.

Figure 1:
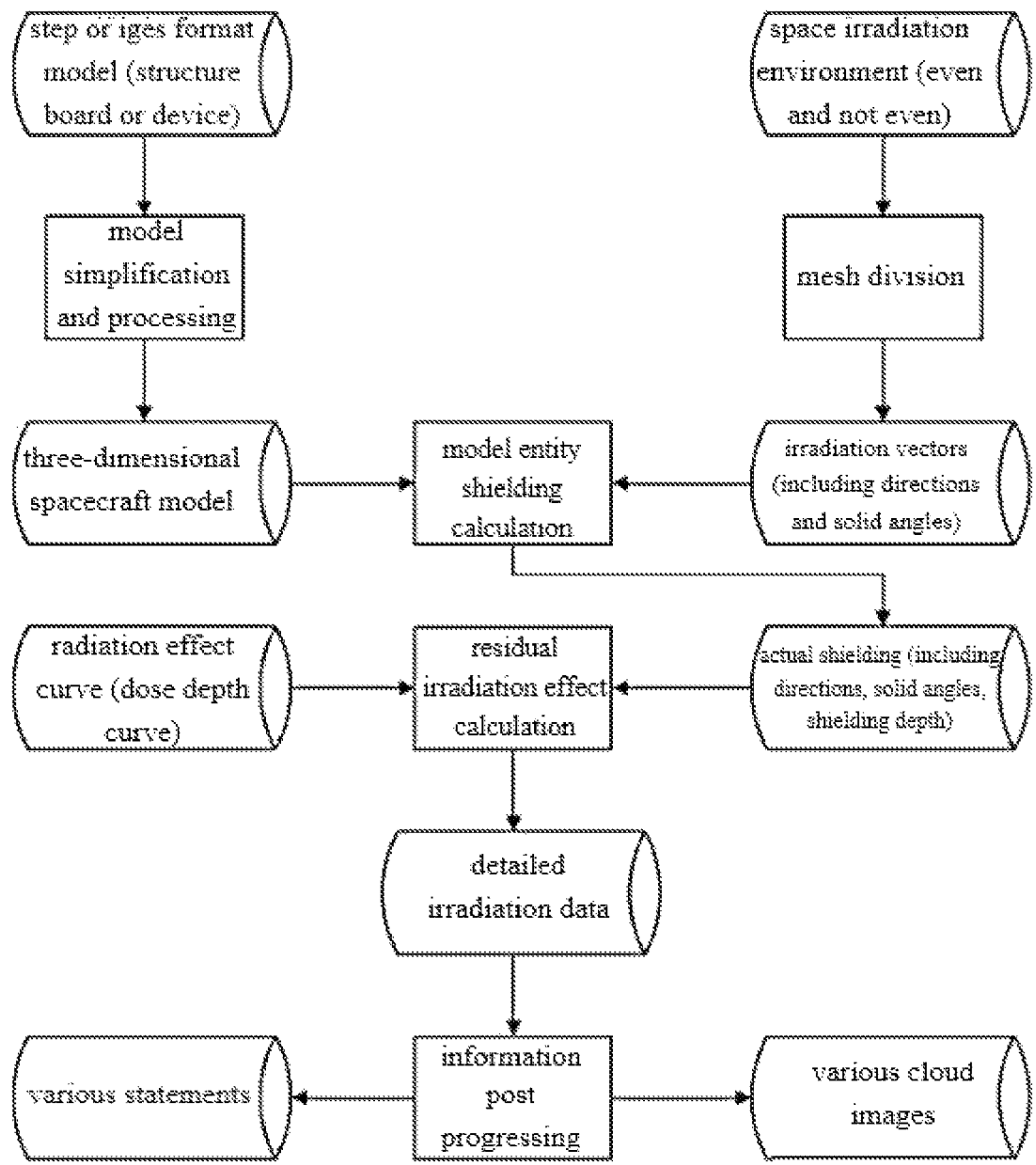
FIG. 1 is a flow diagram of a radiation effect shielding calculation method based on a three-dimensional spacecraft model according to an embodiment of the disclosure.
Figure 2:
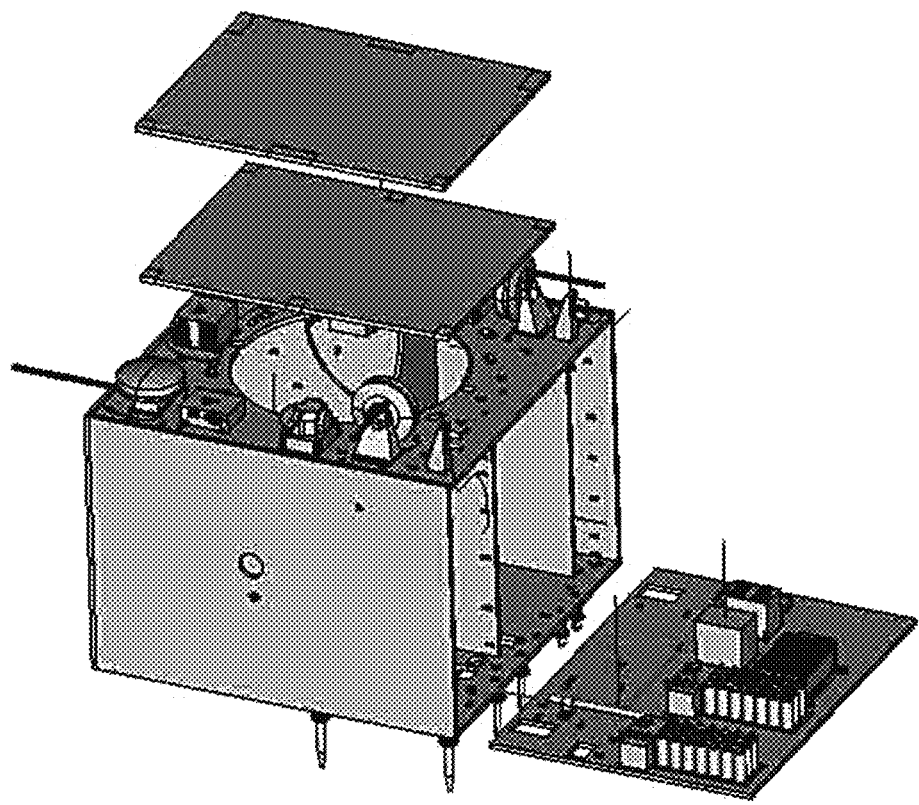
FIG. 2 is a schematic structural diagram of the three-dimensional spacecraft model according to the embodiment of the disclosure.
Figure 3:
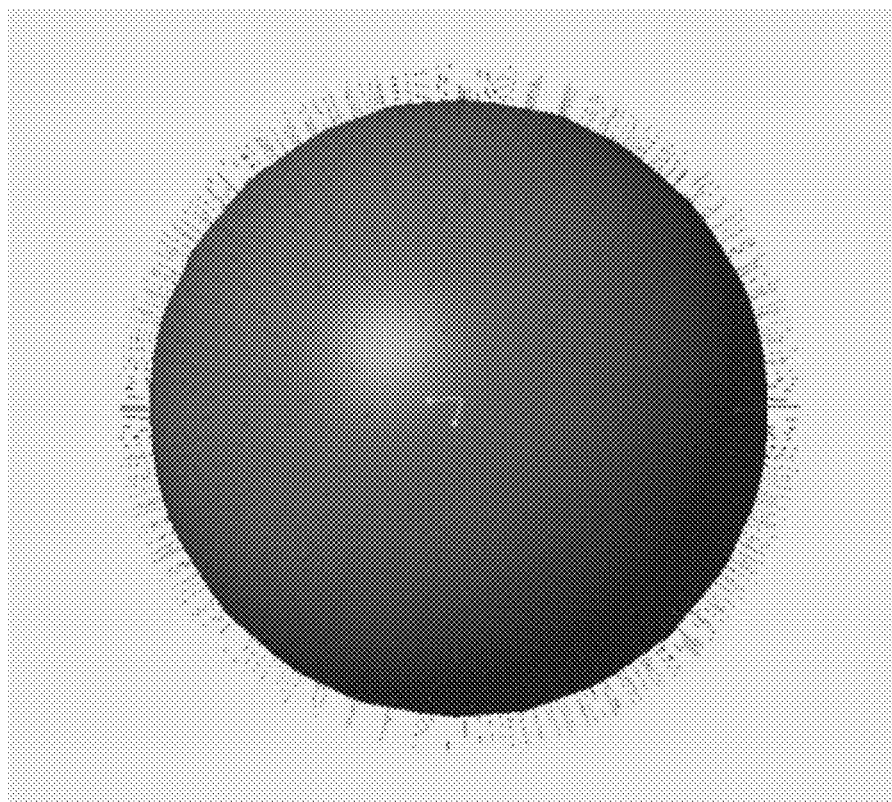
FIG. 3 is a schematic structural diagram of full space irradiation vectors according to an embodiment of the disclosure.
Figure 4A:
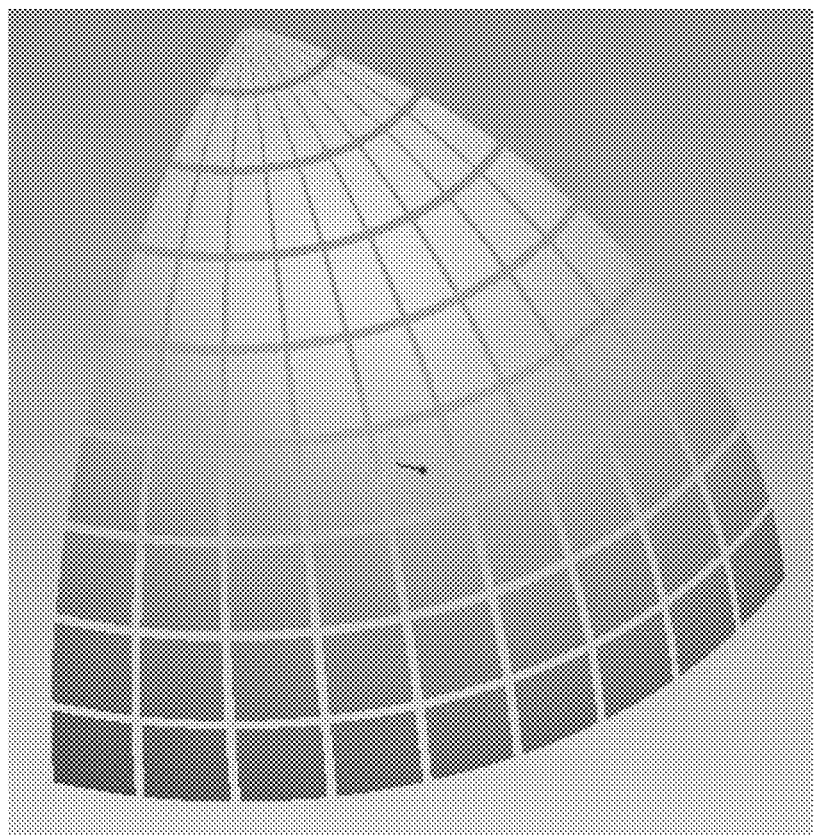
FIG. 4A is a schematic structural diagram of an equal-angle mesh division according to an embodiment of the disclosure.
Figure 4B:
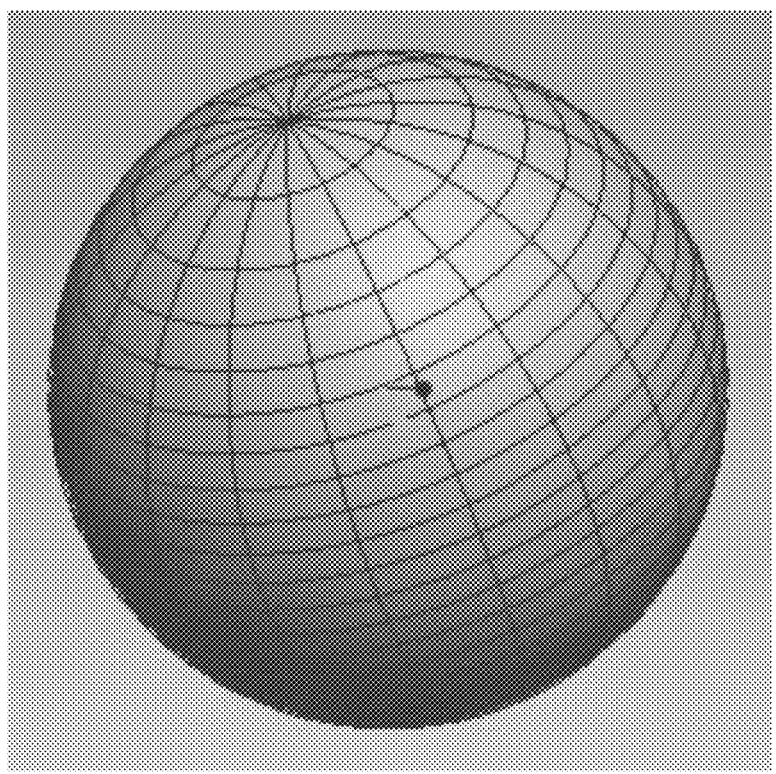
FIG. 4B is a schematic structural diagram of an equal-area mesh division according to an embodiment of the disclosure.
Figure 4C:
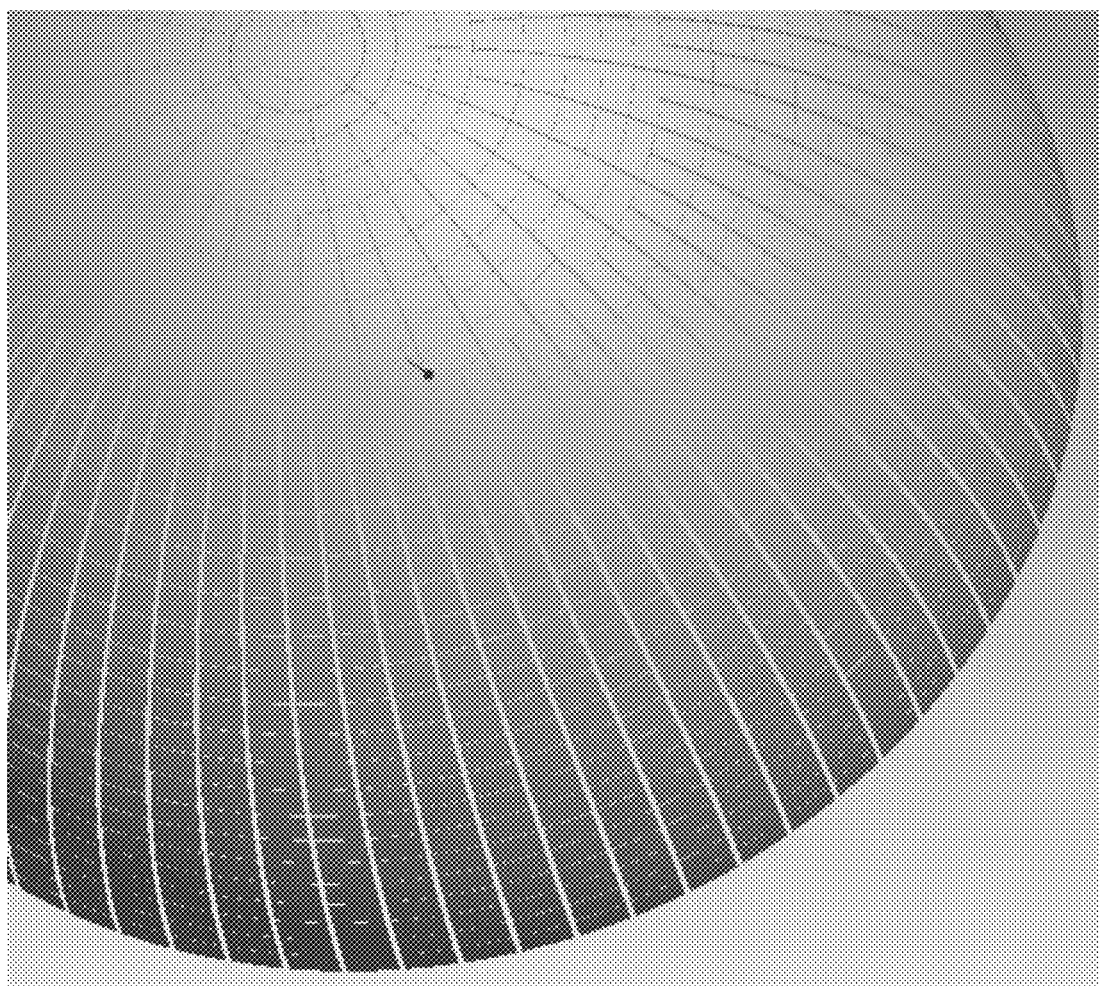
FIG. 4C is a schematic structural diagram of an intelligent mesh division according to an embodiment of the disclosure.
Figure 5:
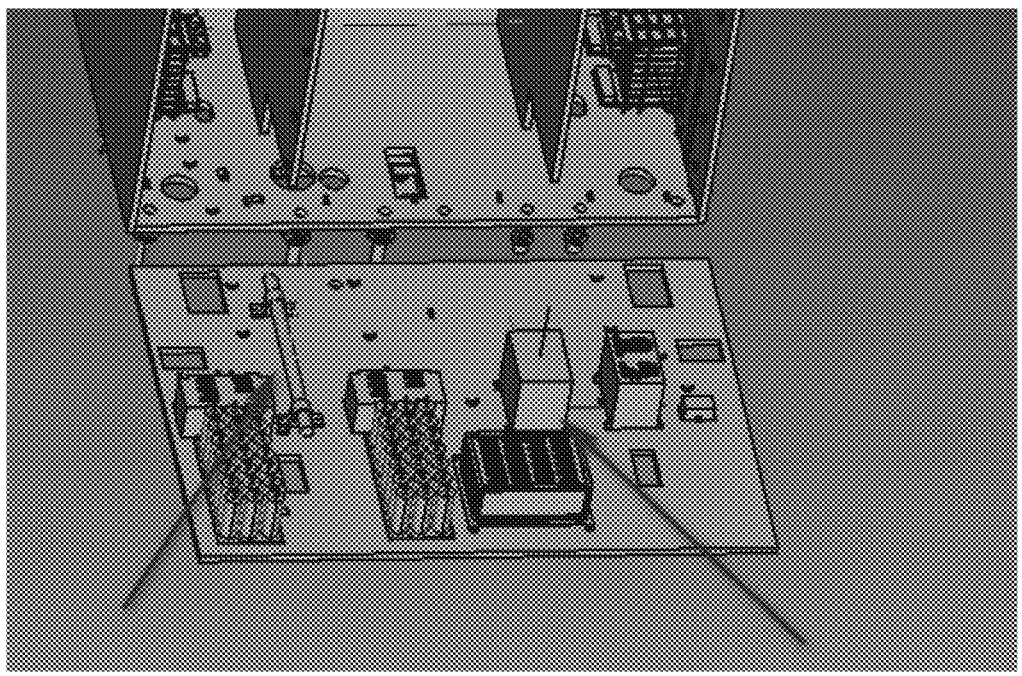
FIG. 5 is a schematic structural diagram of analysis points in the three-dimensional spacecraft model according to an embodiment of the disclosure.
Figure 6:
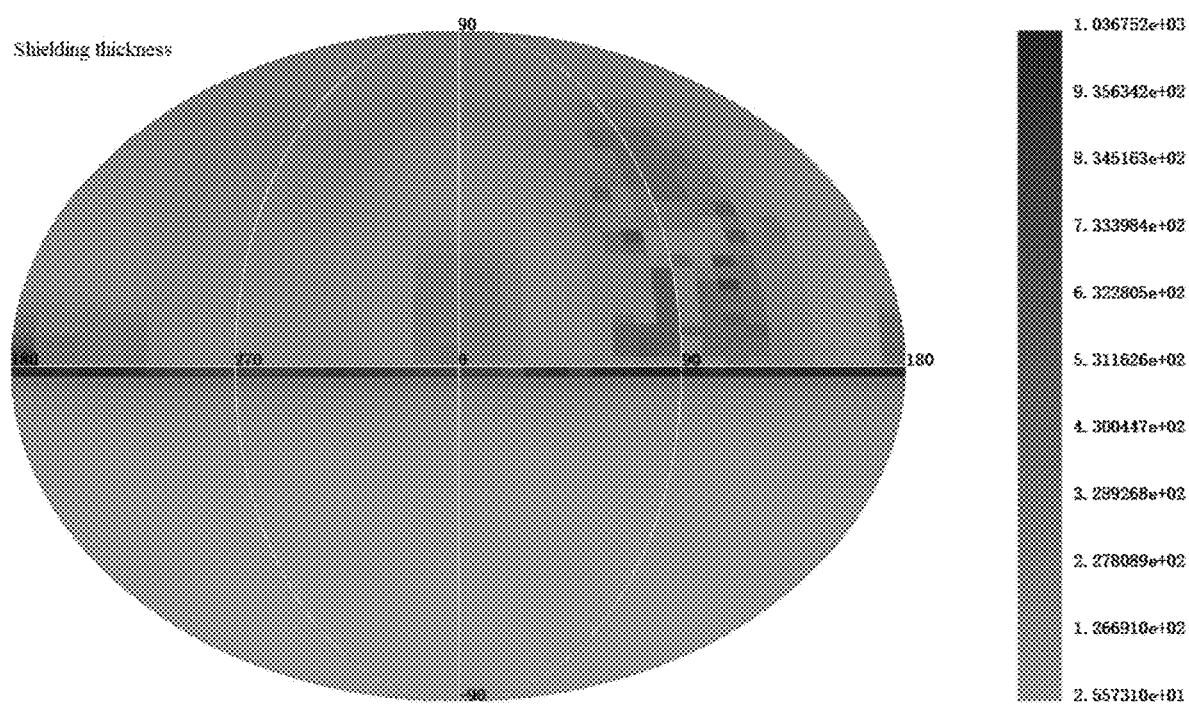
FIG. 6 is a schematic structural diagram of a two-dimensional cloud image of a shielding thickness according to an embodiment of the disclosure.
Figure 7:
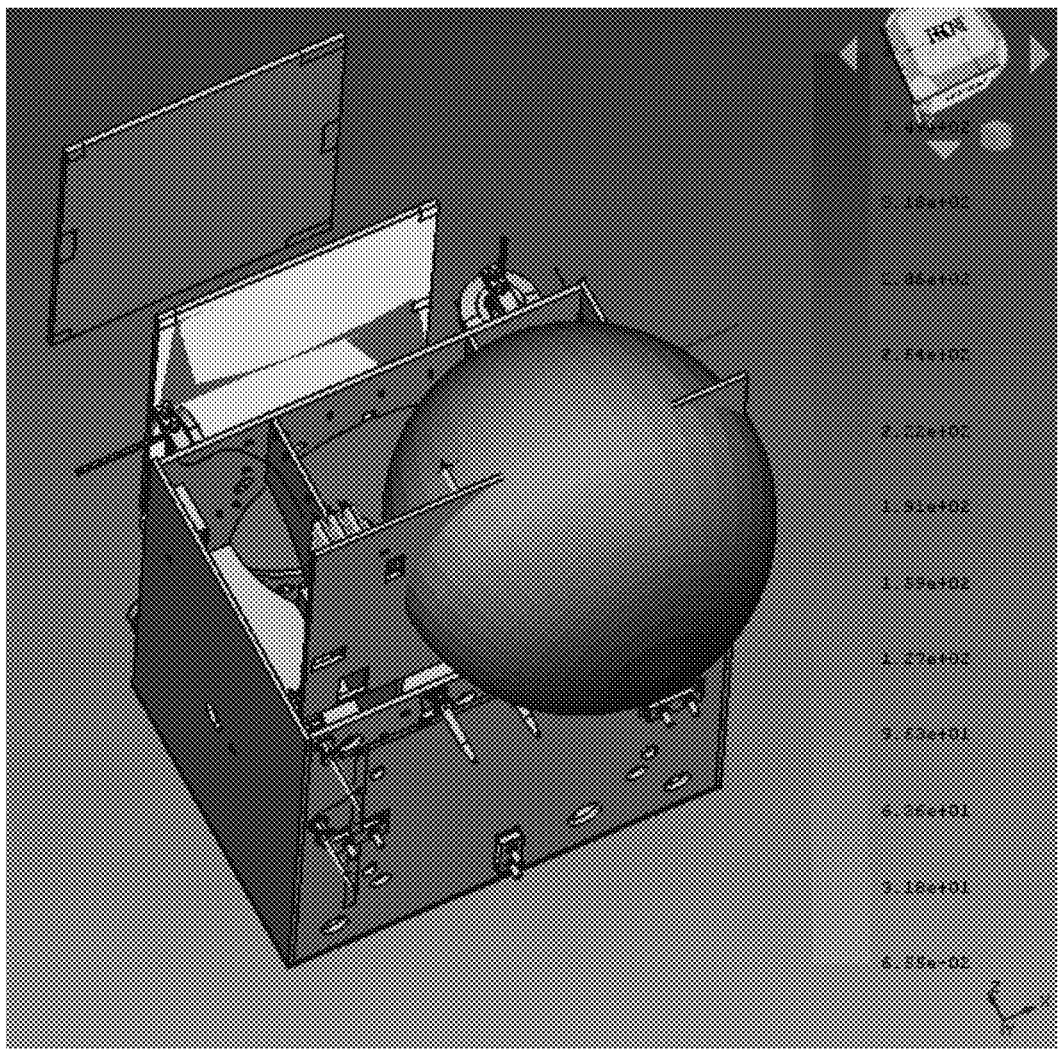
FIG. 7 is a schematic structural diagram of a three-dimensional distribution of actual shielding thicknesses according to an embodiment of the disclosure.
Figure 8:
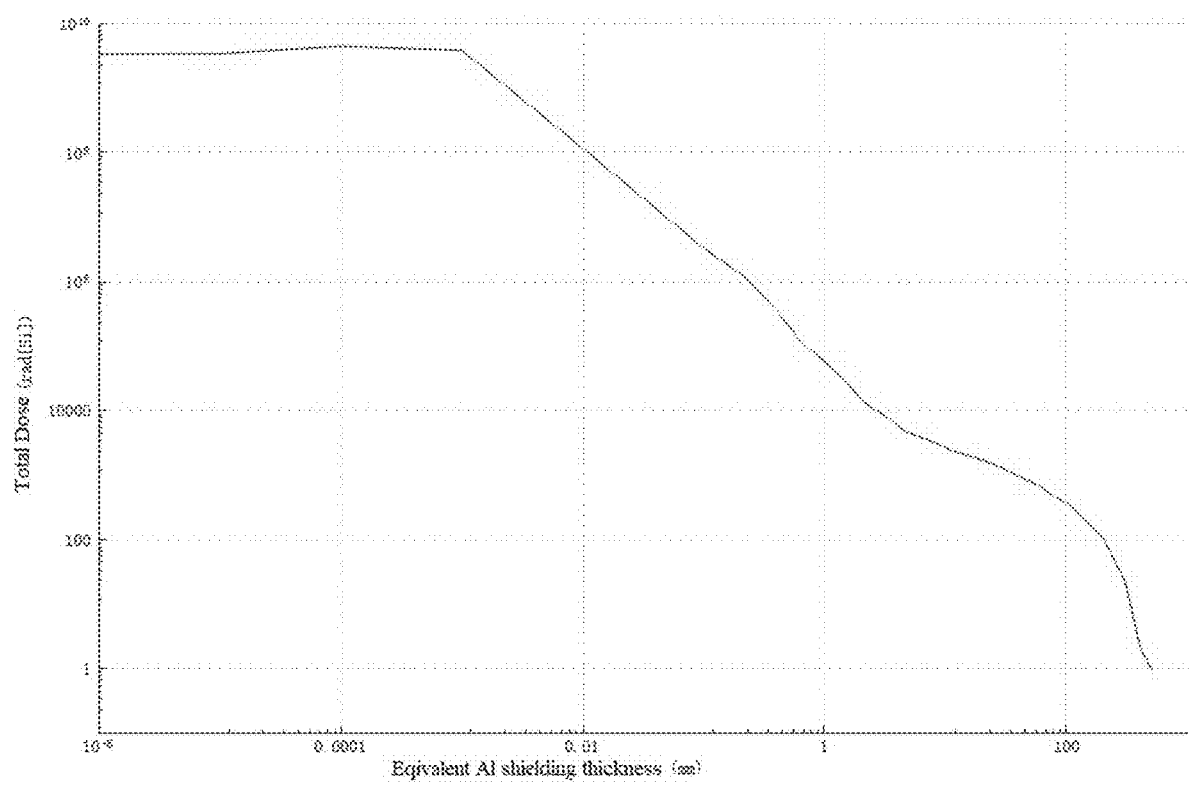
FIG. 8 is a schematic structural diagram of a radiation effect curve according to the embodiment of the disclosure.
Figure 9:
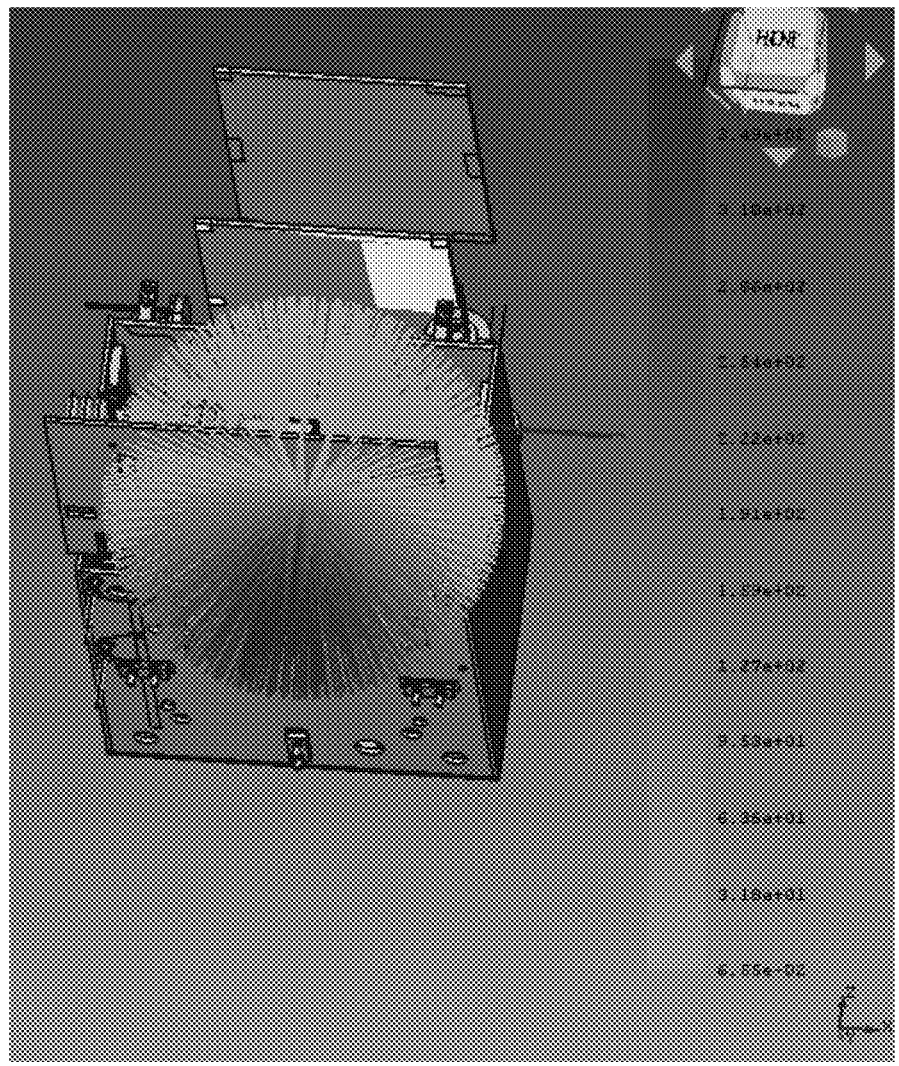
FIG. 9 is a schematic structural diagram of a three-dimensional ray diagram according to an embodiment of the disclosure.

Reference to FIG. 1, the method includes:

step 1, obtaining a three-dimensional spacecraft model;

intelligently checking and modifying the three-dimensional spacecraft model; filtering and simplifying the three-dimensional spacecraft model; and setting material properties;

in an illustrated embodiment of the disclosure, obtaining a three-dimensional spacecraft model file in step format or iges format, which is based on a free CAD software;

extracting information of the three-dimensional spacecraft model file to obtain model information, which includes densities, units, volumes, masses and names of model components;

intelligently checking density accuracy and unit consistency of the model components of the model information; performing interference check to determine whether model entities overlap; and intelligently modifying the model information to make the densities of the model components be accurate, the units of the model components be consistent, and the model entities do not overlap;

according to needs of a user, respectively presetting threshold values for density, volume, mass and name; and determining whether the densities, the units, the volumes, the masses and the names are coved in presetting threshold value ranges respectively;

if any one of the densities, the units, the volumes, the masses and the names in the model information exceeds the presetting threshold value ranges respectively, correspondingly adjusting until that the units, the volumes, the masses and the names in the model information are within the presetting threshold value ranges respectively;

if the densities, the units, the volumes, the masses and the names in the model information are within the presetting threshold value ranges respectively, completing the filtering and simplifying the model components of the three-dimensional spacecraft model;

setting specific material properties of the model components of the three-dimensional spacecraft model by material leading-in or interface setting to determine the material properties of the model components;

thereby obtaining the three-dimensional spacecraft model;

step 2, dividing a $4\pi$ space irradiation environment, where the three-dimensional spacecraft model is located, into meshes to obtain space irradiation vectors corresponding to the meshes respectively; and taking the space irradiation vectors as whole-space irradiation vectors;

setting one or more analysis points at each target model component in the three-dimensional spacecraft model;

in an illustrated embodiment of the disclosure, according to needs of calculation accuracy and efficiency, selecting an equal-angle mesh division with equal angles in longitude and latitude directions or an equal-area mesh division with equal angles in a longitude direction and equal heights in a latitude direction or an intelligent mesh division with equal angles in a longitude direction and equal heights in a latitude direction as well as mesh optimization in two poles, combined with setting numbers of longitudinal divisions and latitudinal divisions in the mesh division to divide the $4\pi$ space irradiation environment, where the three-dimensional spacecraft model is located, into the meshes;

setting the one or more analysis points at the each target model component in the three-dimensional spacecraft model by importing position coordinates of the one or more analysis points in batches or using a mouse to click positions at the target model components;

using a ray tracing method, using each analysis point of the target model components as a starting point, assigning the meshes irradiation vectors that pass through geometrical centers of the meshes corresponding thereto and cover the model entities, with each analysis point as a center and outward directions to obtain the space irradiation vectors corresponding to the meshes respectively; taking the space irradiation vectors as the whole-space irradiation vectors corresponding to each analysis point; marking a position of each mesh while the mesh division to locate the position of the each mesh for subsequent calculation;

step 3, inputting the whole-space irradiation vectors corresponding to each analysis point to the three-dimensional spacecraft model to perform shielding calculation by a shielding thickness calculation method; selecting a slant method or a norm method or a weight method according to a type of radiation particles to obtain a three-dimensional distribution of actual shielding thicknesses at each analysis point; performing an equivalent thickness conversion for different materials to obtain a three-dimensional distribution of equivalent aluminum shielding thicknesses including different directions and solid angles of each analysis point;

in an illustrated embodiment of the disclosure, inputting the whole-space irradiation vectors corresponding to each analysis point to the three-dimensional spacecraft model to performing the shielding calculation by the shielding thickness calculation method, obtaining position coordinates $(x_i, y_i, z_i)$ of an intersection of an ith space irradiation vector and the target model component in the three-dimensional spacecraft model;

calculating a distribution $d=\{d_1, d_2, d_3, \ldots, d_n\}$ of actual intersection thicknesses of actual rays in directions of the space irradiation vectors and the target model components in the three-dimensional spacecraft model, which is calculated by the following formula:

$$d_i = \Sigma_{j=1}^{k} \sqrt{(x_{j1}^2 - x_{j2}^2)}$$

in an illustrated embodiment of the disclosure, $d_i$ representing the actual intersection thickness of the actual ray in the direction of the ith space irradiation vector and the target model components in the three-dimensional spacecraft model; k representing a quantity of the target model components, which intersect with the ith space irradiation vector; $x_{j1}$ representing the position coordinates $(x_{i1}, y_{i1}, z_{i1})$ of the intersection of the actual incident ray on the jth target model component; $x_{j2}$ represents the position coordinates $(x_{j2}, y_{j2}, z_{j2})$ of the intersection of the actual emergent ray on a jth target model component;

selecting the slant method or the norm method or the weight method according to the type of radiation particles to work out the distribution $d=\{d_1, d_2, d_3, \ldots, d_n\}$ of actual intersection thickness; thereby obtaining the three-dimensional distribution of actual shielding thicknesses at each analysis point;

in an illustrated embodiment of the disclosure, the slant method including: obtaining a three-dimensional distribution $d_z=\{d_1, d_2, d_3, \ldots d_n\}$ of actual shielding thicknesses at each analysis point by the actual rays propagating along a straight line in the target model components;

the norm method including: obtaining a three-dimensional distribution $d_f=\{d_1 \times \cos \alpha_1, d_2 \times \cos \alpha_2, d_3 \times \cos \alpha_3, d_n \times \cos \alpha_i\}$ of actual shielding thicknesses at each analysis point by the actual rays propagating along a normal direction of an incident point into a surface when the actual rays shoot into the target model components; of which $\alpha_i$ represents an incident angle, and $i=1, \ldots, n$;

the weight method including: obtaining a three-dimensional distribution $$d_q = \left\{ d_1 \times \frac{1}{2}(\cos\alpha_{11} + \cos\alpha_{12}), d_2 \times \frac{1}{2}(\cos\alpha_{21} + \cos\alpha_{22}), d_3 \times \frac{1}{2}(\cos_{31} + \cos\alpha_{32}), \ldots, d_n \times \frac{1}{2}(\cos\alpha_{i1} + \cos\alpha_{i2}) \right\}$$

of actual shielding thicknesses at each analysis point; of which $\alpha_{i1}$ represents an incident angle and $\alpha_{i2}$ represents an emergent angle, and $i=1, \ldots, n$;

converting the actual shielding thicknesses at each analysis point to the equivalent aluminum shielding thicknesses according to material properties of model components to as the equivalent aluminum shielding thicknesses of the space irradiation vectors respectively; and combining the equivalent aluminum shielding thicknesses of the space irradiation vectors corresponding to each analysis point to obtain the three-dimensional distribution of the equivalent aluminum shielding thicknesses including the different directions and the solid angles of each analysis point;

step 4, calculating residual irradiation effect values of the three-dimensional distribution of the equivalent aluminum shielding thicknesses of each analysis point according to an acquired radiation effect curve to obtain detailed irradiation data of a three-dimensional distribution of irradiation effect values of each analysis point;

in an illustrated embodiment of the disclosure, reading the acquired radiation effect curve and extracting radiation effect depths;

comparing the three-dimensional distribution of the equivalent aluminum shielding thicknesses of each analysis point with the radiation effect depths; performing interpolation calculation on radiation effect values corresponding to the radiation effect depths; taking weight according to a proportion of a mesh area corresponding to the space irradiation vectors in a total mesh area to obtain radiation effect values of the space radiation vector; and using the radiation effect values as the detailed irradiation data of the three-dimensional distribution of the irradiation effect values of the analysis point;

repeating the above process to obtain the detailed irradiation data of the distribution of the three-dimensional irradiation effect value at each analysis point;

step 5, performing information post processing on the detailed irradiation data of the three-dimensional distribution of the irradiation effect values of each analysis point to generate and display a two-dimensional cloud image, a three-dimensional cloud image, a three-dimensional ray diagram and a detailed three-dimensional distribution statement of radiation effect; and integrating the detailed radiation data of the three-dimensional distribution of the irradiation effect values of each analysis point in all directions to obtain a total radiation effect value of each analysis point to evaluate an irradiation effect of each analysis point;

in an illustrated embodiment of the disclosure, displaying the detailed irradiation data of the three-dimensional distribution of the irradiation effect values of each analysis point in color temperature images to obtain the two-dimensional cloud image and the three-dimensional cloud image;

displaying the detailed irradiation data of the three-dimensional distribution of the irradiation effect values of each analysis point in color-temperature colored rays to create the three-dimensional ray diagram;

highlighting and cruising displaying the three-dimensional ray diagram according to a designed longitude and latitude range to display the equivalent aluminum shielding thickness and radiation effect values in the designed longitude and latitude range correspondingly;

generating the detailed three-dimensional distribution statement of radiation effect according to positions of the meshes, the equivalent aluminum shielding thicknesses, and the radiation effect values;

integrating the irradiation effect values of each analysis point in all directions to obtain the total irradiation effect value of each analysis point to evaluate the irradiation effect of each analysis point.

The disclosure also provides a radiation effect shielding calculation apparatus based on a three-dimensional spacecraft model, including:

a model acquisition module, which is used to obtain the three-dimensional spacecraft model, intelligently check and modify the three-dimensional spacecraft model, filter and simplify the three-dimensional spacecraft model and set material properties;

a space division module, which is used to divide a $4\pi$ space irradiation environment, where the three-dimensional spacecraft model is located, into meshes to obtain space irradiation vectors corresponding to the meshes respectively, take the space irradiation vectors as whole-space irradiation vectors, and set one or more analysis points at each target model component in the three-dimensional spacecraft model;

a shielding thickness acquisition module, which is used to input the whole-space irradiation vectors to the three-dimensional spacecraft model to perform shielding calculation by a shielding thickness calculation method, select one of a slant method, a norm method and a weight method according to a type of radiation particles to obtain a three-dimensional distribution of actual shielding thicknesses at each analysis point, and performing an equivalent thickness conversion for different materials to obtain a three-dimensional distribution of equivalent aluminum shielding thicknesses including different directions and solid angles of each analysis point;

an irradiation effect calculation module, which is used to calculate residual irradiation effect values of the three-dimensional distribution of equivalent aluminum shielding thicknesses of each analysis point according to an acquired radiation effect curve to obtain detailed irradiation data of a three-dimensional distribution of irradiation effect values of each analysis point;

an evaluation module, configured to perform information post processing on the detailed irradiation data of the three-dimensional distribution of the irradiation effect values of each analysis point to generate and display a two-dimensional cloud image, a three-dimensional cloud image, a three-dimensional ray diagram and a detailed three-dimensional distribution statement of radiation effect, and integrate the detailed radiation data of the three-dimensional distribution of the irradiation effect values of each analysis point in all directions to obtain a total irradiation effect value of each analysis point, so as to evaluate an irradiation effect of each analysis point.

The disclosure also provides a radiation effect shielding calculation device based on a three-dimensional spacecraft model, which includes a processor and a storage connected with the processor.

The storage is used to store computer programs.

The processor is used to implement the radiation effect shielding calculation method based on the three-dimensional spacecraft model, when the computer programs are executed by the processor.

It should be specific that the above embodiments only aim to describe the technical solutions of the disclosure but not to limit. Although the above embodiments describe the disclosure in detail, it should be understood by those skilled in the technical field that modification or equivalent replacement of the technical solutions of the disclosure cannot depart from the spirit and scope of the technical solutions of the disclosure, which shall be covered by the scope of the disclosure.

What is claimed is:

1. A radiation effect shielding calculation method based on a three-dimensional spacecraft model, comprising:
   step 1, obtaining the three-dimensional spacecraft model;
   step 2, dividing a $4\pi$ space irradiation environment where the three-dimensional spacecraft model is located, into meshes to obtain space irradiation vectors corresponding to the meshes respectively and taking the space irradiation vectors as whole-space irradiation vectors;
   wherein the step 2 comprises:
      selecting a mesh division from a group consisting of an equal-angle mesh division with equal angles in longitude and latitude directions, an equal-area mesh division with equal angles in a longitude direction and equal heights in a latitude direction and an intelligent mesh division with equal angles in a longitude direction and equal heights in a latitude direction as well as mesh optimization in two poles;
      setting numbers of longitudinal divisions and latitudinal divisions in the mesh division to divide the $4\pi$ space irradiation environment where the three-dimensional spacecraft model is located, into the meshes;
      setting one or more analysis points at each of target model components in the three-dimensional spacecraft model by one of importing position coordinates of the one or more analysis points in batches and using a mouse to click positions at the target model components;
      using a ray tracing method, using each of the analysis points of the target model components as a starting point, assigning the meshes irradiation vectors that pass through geometrical centers of the meshes corresponding thereto and cover model entities, with each the analysis point as a center and outward directions, of the three-dimensional spacecraft model, to obtain the space irradiation vectors corresponding to the meshes respectively, and taking the space irradiation vectors as the whole-space irradiation vectors corresponding to each the analysis point;
   step 3, inputting the whole-space irradiation vectors corresponding to each the analysis point to the three-dimensional spacecraft model to perform shielding calculation by a shielding thickness calculation method, selecting one of a slant method, a norm method and a weight method according to a type of radiation particles to obtain a three-dimensional distribution of actual shielding thicknesses at each the analysis point, and performing an equivalent thickness conversion for different materials to obtain a three-dimensional distribution of equivalent aluminum shielding thicknesses including different directions and solid angles of each the analysis point;
   wherein the step 3 comprises:
      inputting the whole-space irradiation vectors corresponding to each the analysis point to the three-dimensional spacecraft model to perform the shielding calculation by the shielding thickness calculation method, obtaining position coordinates $(x_i, y_i, z_i)$ of an intersection of an ith space irradiation vector and the target model component in the three-dimensional spacecraft model, calculating a distribution $d=\{d_1, d_2, d_3, \ldots, d_n\}$ of actual intersection thicknesses of actual rays in directions of the space irradiation vectors and the target model components in the three-dimensional spacecraft model, wherein each the actual intersection thickness is calculated by the following formula:

$$d_i = \sum_{j=1}^{k} \sqrt{(x_{j1}^2 - x_{j2}^2)}$$

wherein $d_i$ represents the actual intersection thickness of the actual ray in the direction of the ith space irradiation vector and the target model components in the three-dimensional spacecraft model; k represents a quantity of the target model components, which intersect with the ith space irradiation vector; $x_{j1}$ represents the position coordinates $(x_{i1}, y_{i1}, z_{i1})$ of the intersection of the actual ray incident on a jth target model component; $x_{j2}$ represents the position coordinates $(x_{j2}, y_{j2}, z_{j2})$ of the intersection of the actual ray emergent on the jth target model component;
      selecting the one of the slant method, the norm method and the weight method according to the type of radiation particles to work out the distribution $d=\{d_1, d_2, d_3, \ldots, d_n\}$ of actual intersection thickness to obtain the three-dimensional distribution of actual shielding thicknesses at each the analysis point;
   wherein the slant method comprises: obtaining a three-dimensional distribution $d_z=\{d_1, d_2, d_3, \ldots, d_n\}$ of actual shielding thicknesses at each the analysis point by the actual rays propagating along a straight line in the target model components;
   wherein the norm method comprises: obtaining a three-dimensional distribution $d_f=\{d_1 \times \cos \alpha_1, d_2 \times \cos \alpha_2, d_3 \times \cos \alpha_3, \ldots, d_n \times \cos \alpha_i\}$ of actual shielding thicknesses at each the analysis point by the actual rays propagating along a normal direction of an incident point into a surface when the actual rays shoot into the target model components; wherein $\alpha_i$ represents an incident angle, and i=1, . . . , n;

wherein the weight method comprises: obtaining a three-dimensional distribution $$d_q = \left\{ d_1 \times \frac{1}{2}(\cos\alpha_{11} + \cos\alpha_{12}), d_2 \times \frac{1}{2}(\cos\alpha_{21} + \cos\alpha_{22}), \right.$$
$$\left. d_3 \times \frac{1}{2}(\cos\alpha_{31} + \cos\alpha_{32}), \ldots, d_n \times \frac{1}{2}(\cos\alpha_{i1} + \cos\alpha_{i2}) \right\}$$

angle and $\alpha_{i2}$ represents an emergent angle, and i=1, . . . , n;

converting the actual shielding thickness at each the analysis point to the equivalent aluminum shielding thicknesses according to material properties of model components to as the equivalent aluminum shielding thicknesses of the space irradiation vectors respectively, and combining the equivalent aluminum shielding thicknesses of the space irradiation vectors corresponding to each the analysis point to obtain the three-dimensional distribution of the equivalent aluminum shielding thicknesses including the different directions and the solid angles of each the analysis point;

step 4, calculating residual irradiation effect values of the three-dimensional distribution of the equivalent aluminum shielding thicknesses of each the analysis point according to an acquired radiation effect curve to obtain detailed irradiation data of a three-dimensional distribution of irradiation effect values of each the analysis point; and step 5, performing information post processing on the detailed irradiation data of the three-dimensional distribution of the irradiation effect values of each the analysis point to generate and display a two-dimensional cloud image, a three-dimensional cloud image, a three-dimensional ray diagram and a detailed three-dimensional distribution statement of radiation effect, and integrating the detailed radiation data of the three-dimensional distribution of the irradiation effect values of each the analysis point in all directions to obtain a total radiation effect value of each the analysis point to evaluate an irradiation effect of each the analysis point.

2. The radiation effect shielding calculation method based on the three-dimensional spacecraft model according to claim 1, wherein the step 1 comprises:

filtering and simplifying the target model components of the three-dimensional spacecraft model and obtaining the target model components after filtering and simplifying, comprising:

obtaining a three-dimensional spacecraft model file in one of a step format file and an iges format file;

extracting information of the three-dimensional spacecraft model file to obtain model information, wherein the model information comprises units, densities, volumes, masses and names of the target model components;

checking unit consistency of the target model components of the model information, and performing interference check to determine whether the model entities overlap;

modifying the model information to make the units of the target model components be consistent with one another, and the model entities do not overlap;

presetting density threshold values, volume threshold values, mass threshold values and name threshold values, and determining whether the densities, the units, the volumes, the masses and the names are coved in presetting threshold value ranges respectively;

adjusting one of the densities, the units, the volumes, the masses and the names until that the densities, the units, the volumes, the masses and the names in the model information are within the presetting threshold value ranges respectively, when the one of the densities, the units, the volumes, the masses and the names in the model information exceeds the presetting threshold value ranges respectively;

completing the filtering and simplifying the target model components of the three-dimensional spacecraft model when the densities, the units, the volumes, the masses and the names in the model information are within the presetting threshold value ranges respectively;

setting specific material properties of the target model components of the three-dimensional spacecraft model by one of material leading-in and interface setting to determine the material properties of the model components; and obtaining the three-dimensional spacecraft model.

3. The radiation effect shielding calculation method based on the three-dimensional spacecraft model according to claim 1, wherein the step 4 comprises:

step 4.1, reading the acquired radiation effect curve and extracting radiation effect depths;

step 4.2, comparing the three-dimensional distribution of the equivalent aluminum shielding thicknesses of each the analysis point with the radiation effect depths, performing interpolation calculation on the irradiation effect values corresponding to the radiation effect depths, taking weight according to a proportion of a mesh area corresponding to the space irradiation vectors in a total mesh area to obtain radiation effect values of the space radiation vector and using the radiation effect values as the detailed irradiation data of the three-dimensional distribution of the irradiation effect values of the analysis point; and step 4.3, repeating the step 4.1 and the step 4.2 to obtain the detailed irradiation data of the three-dimensional distribution of the irradiation effect values of each the analysis point.

4. The radiation effect shielding calculation method based on the three-dimensional spacecraft model according to claim 1, wherein the step 5 comprises:

displaying the detailed irradiation data of the three-dimensional distribution of the irradiation effect values of each the analysis points in a form of color temperature image to obtain the two-dimensional cloud image and the three-dimensional cloud image;

displaying the detailed irradiation data of the three-dimensional distribution of the irradiation effect values of each the analysis point in a form of ray colored by color temperature to create the three-dimensional ray diagram;

highlighting and cruising displaying the three-dimensional ray diagram according to a designed longitude and latitude range to display the equivalent aluminum shielding thickness and radiation effect values in the designed longitude and latitude range correspondingly;

generating the detailed three-dimensional distribution statement of radiation effect according to positions of the meshes, the equivalent aluminum shielding thicknesses, and the radiation effect values; and integrating the irradiation effect values of each the analysis point in all directions to obtain the total irradiation effect value of each the analysis point to evaluate the irradiation effect of each the analysis point.

5. A radiation effect shielding calculation device based on a three-dimensional spacecraft model, comprising:

a processor; and a storage, connected with the processor, wherein the storage is stored with computer programs; and wherein the processor is configured to, when the computer programs are executed by the processor, implement the radiation effect shielding calculation method based on the three-dimensional spacecraft model according to claim 1.

* * * * *